(12) United States Patent
Shuto (10) Patent No.: US 9,100,692 B2
(45) Date of Patent: Aug. 4, 2015

(54) ELECTRONIC DEVICE, METHOD FOR TRANSMITTING DISPLAY DATA, AND COMPUTER PROGRAM PRODUCT

(71) Applicant: KABUSHIKI KAISHA TOSHIBA, Minato-ku, Tokyo (JP)

(72) Inventor: Eita Shuto, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/246,747

(22) Filed: Apr. 7, 2014

(65) Prior Publication Data

US 2015/0002738 A1    Jan. 1, 2015

(30) Foreign Application Priority Data

Jun. 27, 2013 (JP) .................................. 2013-134797

(51) Int. Cl.
*H04N 21/4402* (2011.01)
*H04N 21/41* (2011.01)

(52) U.S. Cl.
CPC ... *H04N 21/440263* (2013.01); *H04N 21/4122* (2013.01)

(58) Field of Classification Search
USPC ......... 348/552, 441, 443, 445, 448, 458–459, 348/555–556, 558
See application file for complete search history.

(56) References Cited

U.S. PATENT DOCUMENTS

| | | | |
|---|---|---|---|
| 6,295,090 B1 * | 9/2001 | Voltz et al. | 348/441 |
| 7,675,574 B2 * | 3/2010 | Ishii et al. | 348/558 |
| 2011/0029606 A1 | 2/2011 | Ozawa | |
| 2013/0176415 A1 * | 7/2013 | Kim et al. | 348/78 |
| 2014/0002740 A1 * | 1/2014 | Mukaide | 348/552 |

FOREIGN PATENT DOCUMENTS

JP    2009-260818 A    11/2009

* cited by examiner

*Primary Examiner* — Trang U Tran
(74) *Attorney, Agent, or Firm* — Knobbe, Martens, Olson & Bear LLP (57) ABSTRACT

According to one embodiment, an electronic device includes a first display, a transmitter and a controller. The first display is configured to display first video. The transmitter is configured to transmit second video to a second electronic device having a second display. The controller is configured to determine a first resolution of the second video based on the first video, to convert the second video to the first resolution, and to transmit the converted second video to the second electronic device.

6 Claims, 4 Drawing Sheets

| RESOLUTION (HORIZONTAL ×VERTICAL) | FRAME RATE [fps] |
|---|---|
| 640×480 | 60 |
| 720×480 | 60 |
| 720×576 | 50 |
| 1280×720 | 30 |
| 1920×1080 | 30 |

ELECTRONIC DEVICE, METHOD FOR TRANSMITTING DISPLAY DATA, AND COMPUTER PROGRAM PRODUCT

CROSS-REFERENCE TO RELATED APPLICATIONS

This application is based upon and claims the benefit of priority from Japanese Patent Application No. 2013-134797, filed on Jun. 27, 2013, the entire contents of which are incorporated herein by reference.

FIELD

An embodiment described herein relates generally to an electronic device, a method for transmitting display data, and a computer program product.

BACKGROUND

Conventionally, there has been known a technology to transmit and receive display data between two electronic devices so as to display video, which corresponds to video displayed on one electronic device side, on the other electronic device side. In such a conventional technology, in general, the resolution of the display data that is transmitted and received is set to the maximum resolution supported by both the transmitting side electronic device and the receiving side electronic device.

In the above conventional technology, as an example, it is desirable that the resolution of the display data that is transmitted and received can also be set to a resolution that is smaller than the maximum resolution supported by both the transmitting side electronic device and the receiving side electronic device.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, an electronic device comprises a first display, a transmitter and a controller. The first display is configured to display first video. The transmitter is configured to transmit second video to a second electronic device having a second display. The controller is configured to determine a first resolution of the second video based on the first video, to convert the second video to the first resolution, and to transmit the converted second video to the second electronic device.

The following describes an embodiment with reference to the drawings.

Described first with reference to FIG. 1 to FIG. 5 is an example of an overall structure of a video display system 100 comprising a tablet 10 according to one embodiment.

Figure 1:
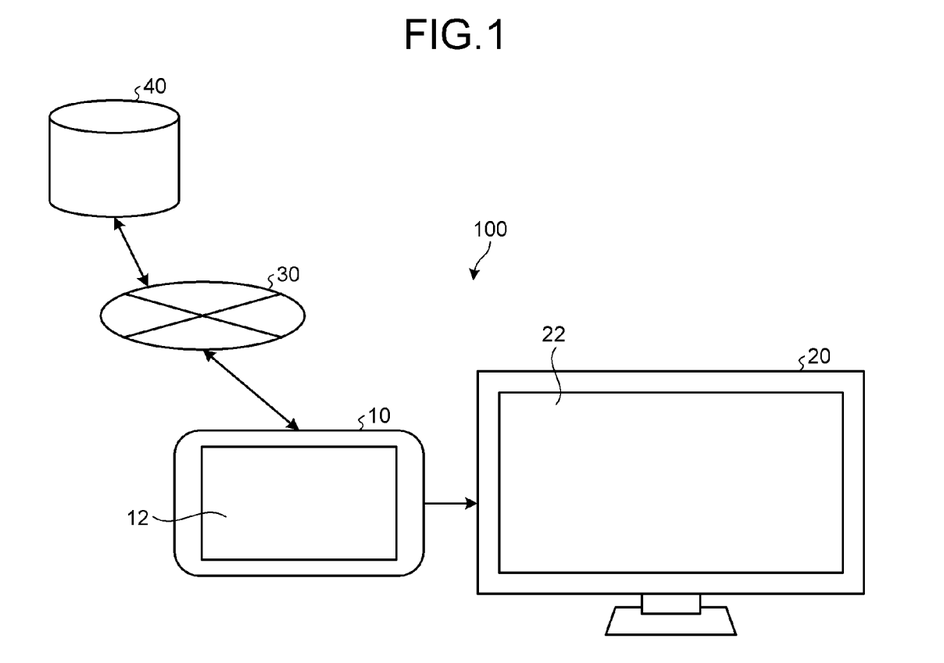
FIG. 1 is an exemplary schematic diagram illustrating an overall structure of a video display system comprising a tablet according to one embodiment.

As illustrated in FIG. 1, the video display system 100 comprises the tablet 10 and a television device 20. The tablet 10 is an example of an "electronic device" and a "first electronic device". The television device 20 is an example of a "second electronic device".

The tablet 10 is connected to a server 40 through a network 30 such as the Internet. This server 40 is configured to distribute content such as moving images and still images through the network 30.

The tablet 10 and the television device 20 are communicably connected to each other. For example, the tablet 10 is configured, so that various kinds of data (for example, display data for displaying video) are transmitted from the tablet 10 to the television device 20, to perform communications in conformity with a wireless communication standard (for example, Wi-Fi Direct (registered trademark)) that requires no access point such as a router. As a technology for transmitting and receiving display data between two devices in above manner, for example, a technology called Miracast (registered trademark) is known.

Figure 2:
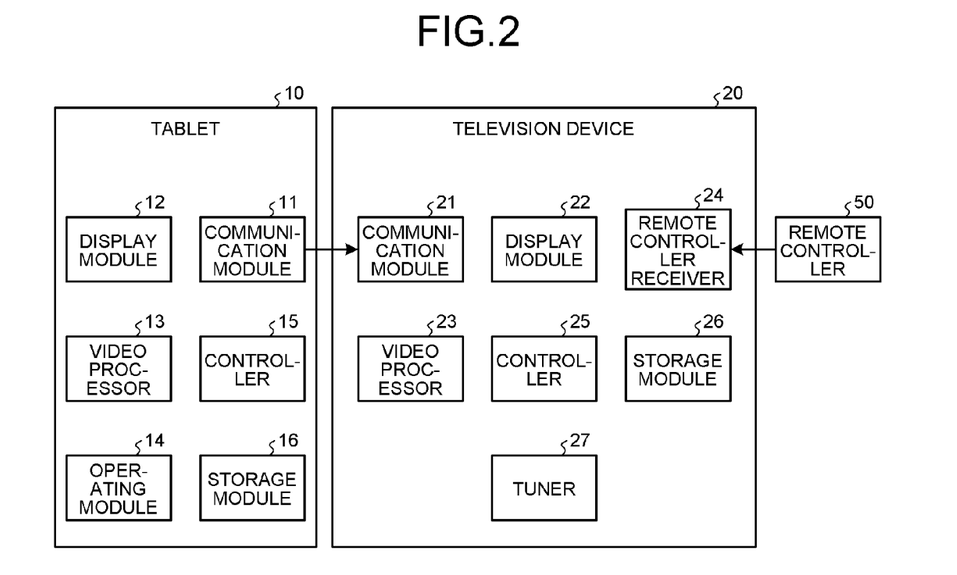
FIG. 2 is an exemplary block diagram illustrating internal structure of the tablet and a television device in the embodiment.

As illustrated in FIG. 2, the tablet 10 comprises a communication module 11, a display module 12, a video processor 13, an operating module 14, a controller 15, and a storage module 16. The television device 20 comprises a communication module 21, a display module 22, a video processor 23, a remote controller receiver 24, a controller 25, a storage module 26, and a tuner 27. The communication module 11 is an example of a "transmitter". The display modules 12 and 22 are examples of a "first display" and a "second display", respectively.

The communication module 11 of the tablet 10 is connected to the server 40 (see FIG. 1) through the network 30. The communication module 11 is communicably connected to the communication module 21 of the television device 20. The display module 12 of the tablet 10 is configured to be capable of displaying video such as content distributed from the server 40. The display module 12 is configured to be capable of displaying video of various sizes. In other words, the display module 12 is configured to be capable of displaying video at different resolutions (horizontal×vertical screen sizes).

The video processor 13 of the tablet 10 has a function of performing video processing (resolution conversion, encoding, decoding, or the like) on display data corresponding to video displayed on the display module 12. The operating module 14 of the tablet 10 includes a touch panel or the like using the display module 12.

The controller 15 of the tablet 10 is configured to control each component of the tablet 10. The storage module 16 of the tablet 10 is provided in order to store therein various programs executed by the controller 15 and various kinds of data used when these various programs are executed.

As illustrated in FIG. 2, the communication module 21 of the television device 20 is communicably connected to the communication module 11 of the tablet 10. The display module 22 of the television device 20 is configured to be capable of displaying video at different resolutions. The video processor 23 of the television device 20 has a function of performing video processing on display data corresponding to video displayed on the display module 22.

The remote controller receiver 24 of the television device 20 is configured to receive a remote controller signal transmitted from a remote controller 50 for operating the television device 20. The controller 25 of the television device 20 is configured to control each component of the television device 20. The storage module 26 of the television device 20 is provided in order to store therein various programs executed by the controller 25. The tuner 27 of the television device 20 is provided in order to receive a broadcast wave transmitted from a broadcasting station (not illustrated).

Figure 3:
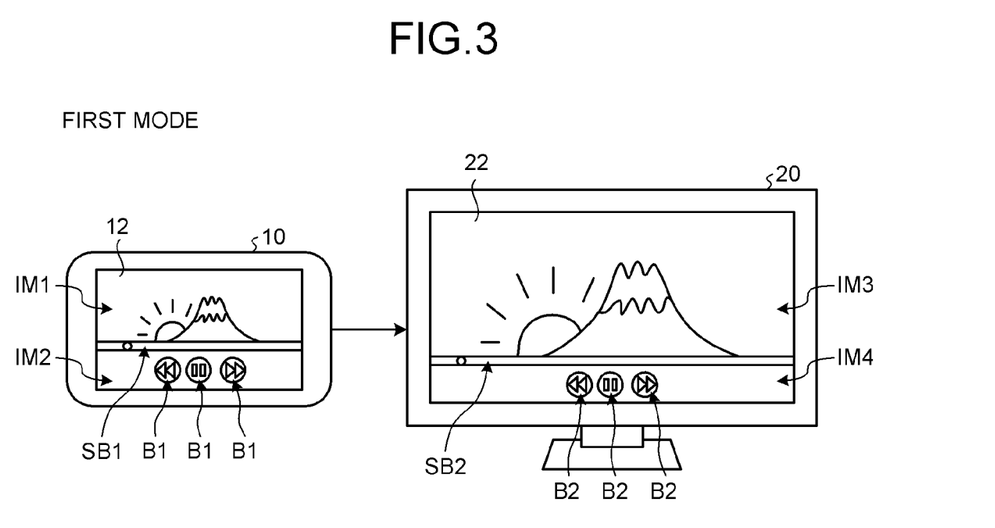
FIG. 3 is an exemplary diagram illustrating a state in which the tablet is transmitting display data to the television device in a first mode in the embodiment.
Figure 4:
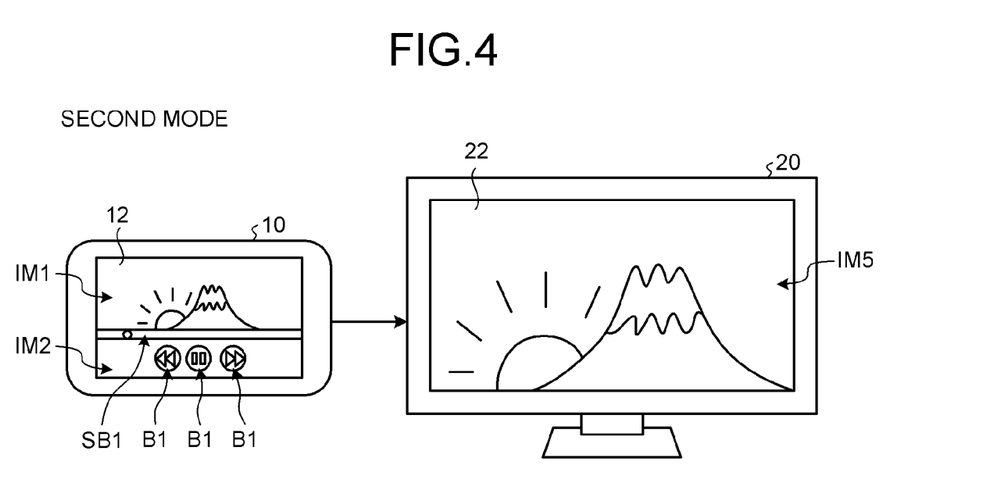
FIG. 4 is an exemplary block diagram illustrating a state in which the tablet is transmitting the display data to the television device in a second mode in the embodiment.

In the embodiment, as illustrated in FIG. 3 and FIG. 4, the controller 15 of the tablet 10 is configured to be capable of allowing the display module 22 of the television device 20 to display video corresponding to video displayed on the display module 12 of the tablet 10. The video displayed on the tablet 10 side is called the first video below. The first video includes content distributed from the server (see FIG. 1) and moving images and still images stored in the storage module 16. The video displayed on the television device 20 side is called the second video below. The controller 15 of the tablet 10 performs resolution conversion (and encoding) on display data corresponding to the first video using the video processor 13 and transmits the display data thus converted (and encoded) to the television device 20 through the communication module 11, so that the second video corresponding to the first video is displayed on the television device 20 side.

In the embodiment, when the video corresponding to video on the tablet 10 side is displayed on the television device 20 side, selection is allowed between a first mode (Mirroring mode: see FIG. 3) and a second mode (Video-Only mode: see FIG. 4). In the first mode, the display module 22 of the television device 20 displays video (third video) as the second video. The third video corresponds to the entire display screen of the display module 12. The entire display screen includes the first video. In the second mode, the display module 22 of the television device 20 displays video (fourth video) as the second video. The fourth video corresponds to the first video of the entire display screen of the display module 12. Such mode selection is performed based on an operation on the operating module 14 of the tablet 10 or the like by a user.

With reference to FIG. 3 and FIG. 4, the first mode and the second mode will be described. The following describes an example in which the display module 12 of the tablet 10 displays an image IM1 of a moving image (the first video) distributed from the server 40 (see FIG. 1) and an image IM2 including an operating button B1 and a seek bar SB1 for operating the moving image.

In the first mode illustrated in FIG. 3, the display module 22 of the television device 20 displays a screen corresponding to the entire display screen of the display module 12 of the tablet 10. Specifically, the display module 22 of the television device 20 displays both an image IM3 corresponding to the image IM1 (the first video: the moving image distributed from the server 40 (see FIG. 1)) and an image IM4 corresponding to the image IM2 on the tablet 10 side (an image including an operating button B2 and a seek bar SB2).

In contrast, in the second mode illustrated in FIG. 4, unlike the first mode, the display module 22 of the television device 20 displays not the image corresponding to the entire display screen of the display module 12 of the tablet 10 but the moving image part, which corresponds to the first video displayed on the display module 12 of the tablet 10, of the entire display screen. Specifically, the display module 22 of the television device 20 displays only an image IM5 corresponding to the image IM1 of the first video on the tablet 10 side (the image of the moving image distrusted from the server 40).

No matter either of the first mode and the second mode is selected, when the second video corresponding to the first video on the tablet 10 side is allowed to be displayed on the television device 20 side, a resolution (first resolution) for displaying the second video on the television device 20 side needs to be determined. In other words, when transmitting the display data corresponding to the first video to the television device 20, the controller 15 of the tablet 10 needs to determine which resolution the display data is converted to have using the video processor 13.

In the embodiment, the controller 15 of the tablet 10 sets (determines) firstly a standard resolution based on the display data corresponding to the first video. The standard resolution is smaller than the maximum resolution allowed by both the display module 12 of the tablet 10 and the display module 22 of the television device 20. Then, the controller 15 determines a target resolution as the resolution of the second video. The target resolution is a resolution closest to the standard resolution and common to the display module 12 of the tablet 10 and the display module 22 of the television device 20.

Thus, in the embodiment, the controller 15 determines the target resolution based on the display data corresponding to the first video, converts (and encodes) the display data to have the determined target resolution, and transmits it to the television device 20, so that the second video corresponding to the first video on the tablet 10 side is displayed on the television device 20 side. The following describes in more detail how the standard resolution and the target resolution are determined.

To determine the standard resolution, the controller 15 determines first which of the first mode (see FIG. 3) and the second mode (see FIG. 4) is selected. If the first mode (see FIG. 3) is selected, the controller 15 sets the resolution of the entire display screen of the display module 12 (the total resolution of the images IM1 and IM2 in FIG. 3) as the standard resolution. On the other hand, if the second mode (see FIG. 4) is selected, the controller 15 sets the resolution of the first video displayed on the display module 12 (the horizontal×vertical resolution of only the image (moving image) IM1 in FIG. 4) as the standard resolution.

To determine the target resolution, the controller 15 sets the minimum resolution that is not less than the standard resolution and common to the display module 12 of the tablet 10 and the display module 22 of the television device 20, as the target resolution. The controller 15 determines whether there is any resolution of the display module 12 (second resolution) that matches a minimum resolution of the display module 22 (minimum third resolution) that is not less than the standard resolution. If the second resolution that matches the minimum third resolution exists, the controller 15 sets the second resolution that matches the minimum third resolution as the target resolution. On the other hand, if no second resolution that matches the minimum third resolution exists, the controller 15 repeats a first cycle determining whether there is any second resolution that matches a third resolution that is larger than the standard resolution next to the minimum third resolution. Consequently, the target resolution that is closest to and not less than the standard resolution can be determined.

If repetition of the first cycle fails to determine the target resolution, the controller 15 sets the maximum resolution that is less than the standard resolution and matches both the third resolution and the second resolution, as the target resolution, and then determines whether there is any second resolution that matches the maximum third resolution that is less than the standard resolution. If the second resolution that matches the maximum third resolution exists, the controller 15 sets the second resolution as the target resolution. On the other hand, if no second resolution that matches the maximum third resolution exists, the controller 15 repeats a second cycle determining whether there is any second resolution that matches the third resolution that is smaller than the standard resolution next to the maximum third resolution. Consequently, if the target resolution that is closest to and not less than the standard resolution is not determined by repeating the first cycle, the target resolution that is closest to and less than the standard resolution can be determined by repeating the second cycle.

In the embodiment, when the second video corresponding to the first video on the tablet 10 side is allowed to be displayed on the television device 20 side, it is needed to set (determine) not only a resolution for displaying the second video on the television device 20 side, but also a frame rate for displaying the second video on the television device 20 side. In other words, when transmitting the display data corresponding to the first video to the television device 20, the controller 15 of the tablet 10 needs to determine which frame rate the display data is converted to have using the video processor 13.

Figure 5:
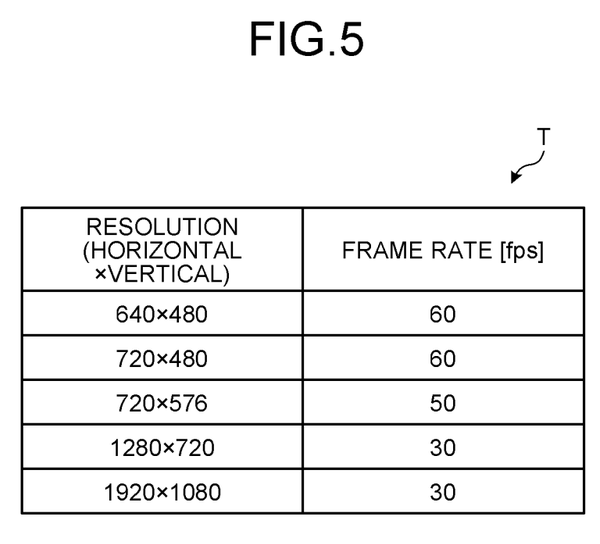
FIG. 5 is an exemplary diagram illustrating the correspondence relation between resolution and frame rate.

In the embodiment, the resolution and the frame rate are associated with each other in advance by settings or the like. Therefore, the frame rate corresponding to the target resolution is automatically set when the target resolution is determined as described above. In the embodiment, the controller 15 of the tablet 10 is configured to set the frame rate based on such a table T as illustrated in FIG. 5, for example. The table T is stored in, for example, the storage module 16.

In the table T illustrated in FIG. 5, as an example, the resolution and the frame rate are associated with each other in a one-to-one manner. When the target resolution (the horizontal×vertical resolution) is set to 640×480 (720×480), the frame rate is set to 60 fps. When the target resolution is set to 720×576, the frame rate is set to 50 fps. When the target resolution is set to 1280×720 (1920×1080), the frame rate is set to 30 fps. In general, a larger resolution is associated with a smaller frame rate, and a smaller resolution is associated with a larger frame rate.

Figure 6:
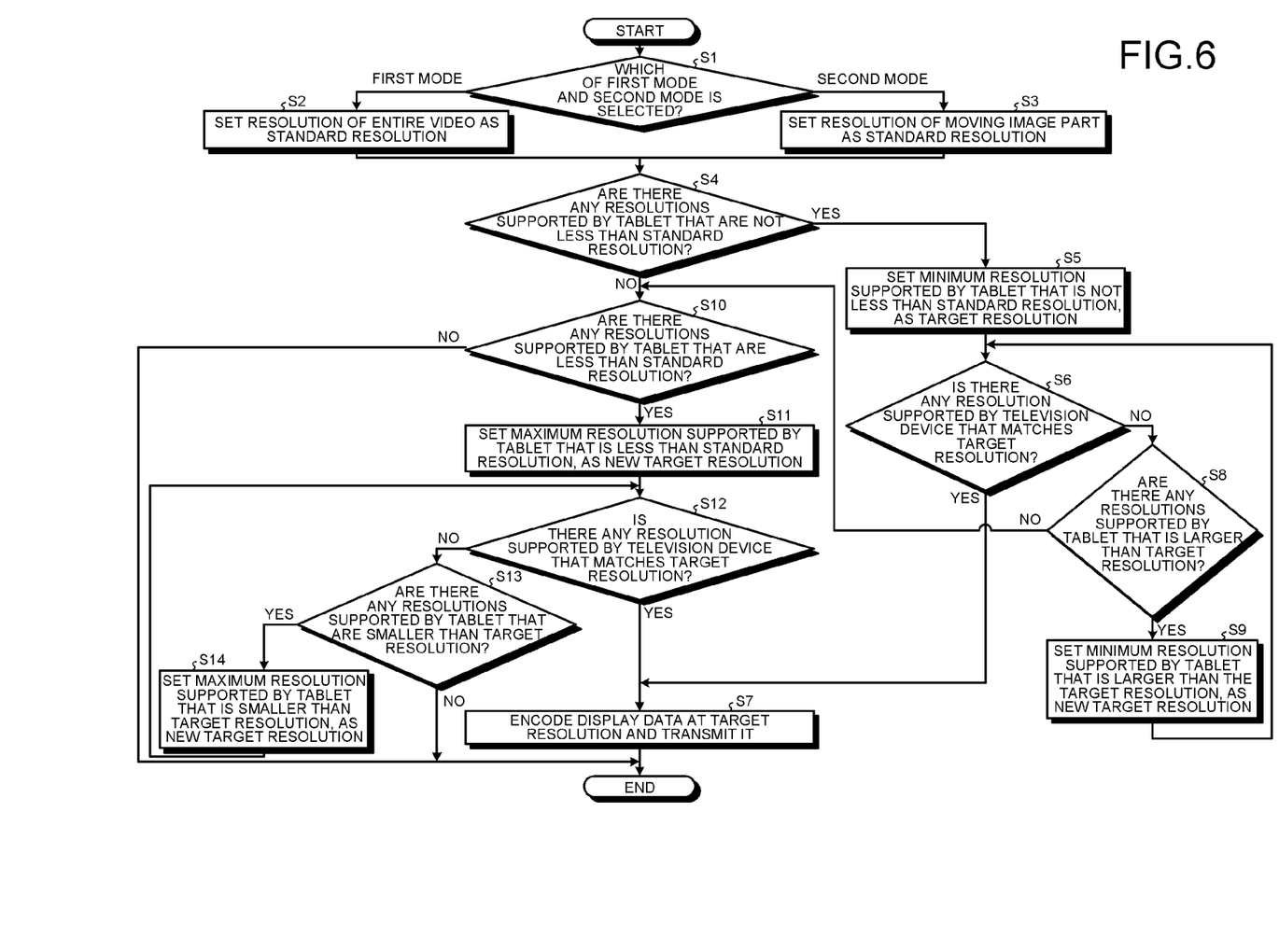
FIG. 6 is an exemplary flowchart of processing performed by a controller of the tablet when video on the tablet side is displayed on the television device side in the embodiment.

Described next with reference to FIG. 6 is an example of a processing flow performed by the controller 15 of the tablet 10 when video on the tablet 10 side is displayed on the television device 20 side in the embodiment.

In this processing flow, first at S1 as illustrated in FIG. 6, processing is performed to determine which of the first mode (see FIG. 3) and the second mode (see FIG. 4) is selected as the mode for displaying the video on the tablet 10 side on the television device 20 side.

If it is determined at S1 that the first mode is selected, the processing advances to S2. At S2, processing is performed to set the resolution of the entire video displayed on the display module 12 (the total resolution of the images IM1 and IM2 in FIG. 3) as the standard resolution.

If it is determined at S1 that the second mode is selected, the processing advances to S3. At S3, processing is performed to set the resolution of the moving image part (first video) of the entire display screen (the horizontal×vertical resolution of the image IM1 in FIG. 4) as the standard resolution.

After the processing at S2 or S3 is performed, the processing advances to S4. At S4, processing is performed to determine whether there is any resolutions that are not less than the standard resolution among the resolutions supported by the display module 12 of the tablet 10.

If it is determined at S4 that the display module 12 of the tablet 10 supports the resolutions that are not less than the standard resolution, the processing advances to S5. At S5, processing is performed to set the minimum resolution supported by the display module 12 of the tablet 10 that is not less than the standard resolution, as the target resolution, and then the processing advances to S6.

At S6, processing is performed to determine whether there is any resolution that matches the target resolution among the plurality of resolutions supported by the display module 22 of the television device 20.

If it is determined at S6 that the display module 22 of the television device 20 supports the resolution that matches the target resolution, the processing advances to S7. At S7, processing is performed to encode the display data corresponding to the first video at the target resolution and to transmit it to the television device 20. Along with this, the frame rate of the display data is set based on the table T illustrated in FIG. 5 or the like. The processing then ends.

If it is determined at S6 that display module 22 of the television device 20 does not support the resolution that matches the target resolution, the processing advances to S8. At S8, processing is performed to determine whether there are any resolutions that are larger than the target resolution among the resolutions supported by the display module 12 of the tablet 10.

If it is determined at S8 that the display module 12 of the tablet 10 supports the resolutions that are larger than the target resolution, the processing advances to S9. At S9, processing is performed to set the minimum resolution supported by the display module 12 of the tablet 10 that is larger than the target resolution, as a new target resolution. In other words, processing is performed at S9 to set the resolution that is larger than the standard resolution next to the target resolution set at S5, as the new target resolution, and then the processing returns to S6.

If it is determined at S4 that the display module 12 of the tablet 10 does not support the resolutions that are not less than the standard resolution, and if it is determined at S8 that the display module 12 of the tablet 10 does not support the resolutions that are larger than the target resolution, the processing advances to S10. At S10, processing is performed to determine whether there are any resolutions that are less than the standard resolution among the resolutions supported by the display module 12 of the tablet 10.

If it is determined at S10 that the display module 12 of the tablet 10 does not support the resolutions that are less than the standard resolution, the processing ends without such processing to encode the display data as performed at S7. If it is determined at S10 that the display module 12 of the tablet 10 supports the resolutions that are less than the standard resolution, the processing advances to S11.

At S11, processing is performed to set the maximum resolution supported by the display module 12 of the tablet 10 that is less than the standard resolution, as a new target resolution, and then the processing advances to S12. At S12, processing is performed to determine whether there is any resolution that matches the target resolution among the resolutions supported by the display module 22 of the television device 20.

If it is determined at S12 that the display module 22 of the television device 20 supports the resolution that matches the target resolution, the processing advances to S7. At S7, the processing is performed to encode the display data at the target resolution and to transmit it to the television device 20, and then the processing ends. If it is determined at S12 that the display module 22 of the television device 20 does not support the resolution that matches the target resolution, the processing advances to S13.

At S13, processing is performed to determine whether there are any resolutions that are smaller than the target resolution among the resolutions supported by the display module 12 of the tablet 10. If it is determined at S13 that the display module 12 of the tablet 10 does not support the resolutions that are smaller than the target resolution, the processing ends without such processing to encode the display data as performed at S7. If it is determined at S13 that the display module 12 of the tablet 10 supports the resolutions that are smaller than the target resolution, the processing advances to S14.

At S14, processing is performed to set the maximum resolution supported by the display module 12 of the tablet 10 that is smaller than the target resolution, as a new target resolution. In other words, processing is performed at S14 to set the resolution that is larger than the standard resolution next to the target resolution set at S11, as a new target resolution, and then the processing returns to S12.

As described above, in the embodiment, until the processing to set the target resolution and to transmit the display data encoded at the target resolution to the television device 20 (the processing at S7) is performed, the first cycle (the cycle comprising S6, S8, and S9) and the second cycle (the cycle comprising S12 to S14) are repeated. The first cycle is a cycle for searching the target resolution that is closest to and not less than the standard resolution. The second cycle is a cycle for searching the target resolution that is closest to and less than the standard resolution.

As described above, in the embodiment, the controller 15 of the tablet 10 is configured to determine the first resolution of the second video based on the first video, to convert the second video to the first resolution, and to transmit the converted second video to the television device 20. Thus, as an example, based on the display data corresponding to the first video, the target resolution of the display data that is transmitted and received between the tablet 10 and the television device 20 can be set so as to be smaller than the maximum resolution among the resolutions supported by both the tablet 10 on the transmitting side and the television device 20 on the receiving side. Consequently, as an example, the frame rate of the display data that is transmitted and received between the tablet 10 and the television device 20 can be relatively increased, thereby the resolution and the frame rate of the second video displayed on the television device 20 side can be set well balanced. As a result of this, as an example, the video quality of the second video can be improved.

In the embodiment, as described above, the controller 15 is configured to set the standard resolution based on the first video and to set the target resolution of the second video based on the standard resolution. The standard resolution is a resolution that is smaller than the maximum resolution allowed (supported) by both the display module 12 of the tablet 10 and the display module 22 of the television device 20. The target resolution is a resolution closest to the standard resolution and common to the display module 12 of the tablet 10 and the display module 22 of the television device 20. As a result of this, as an example, because the target resolution can be set to a resolution that is closest to the standard resolution, the target resolution can be easily set to a resolution that is smaller than the maximum resolution supported by both the display module 12 of the tablet 10 and the display module 22 of the television device 20.

In the embodiment, as described above, the controller 15 is configured to set the minimum resolution that is not less than the standard resolution and common to the display module 12 of the tablet 10 and the display module 22 of the television device 20, as the target resolution. Thus, as an example, because the target resolution can be set to a resolution that is not less than the standard resolution and is relatively small, the frame rate of the display data to be transmitted to the television device 20 can be relatively increased. As a result of this, as an example, the video quality of the second video can be improved.

In the embodiment, as described above, the controller 15 is configured to determine whether there is any second resolution of the second video that matches the minimum third resolution supported by the display module 12 of the tablet 10 that is not less than the standard resolution. The controller 15 is configured to set, if the second resolution that matches the minimum third resolution exists, the second resolution that matches the minimum third resolution as the target resolution. The controller 15 is configured to repeat, if no second resolution that matches the minimum third resolution exists, the first cycle determining whether there is any second resolution that matches the third resolution that is larger than the standard resolution next to the minimum third resolution. As a result of this, as an example, because the target resolution is searched for successively in ascending resolution order among resolutions that are not less than the standard resolution, the target resolution that is closest to the standard resolution can be easily set.

In the embodiment, as described above, the controller 15 is configured to set, if repetition of the first cycle fails to set the target resolution, the maximum resolution that is less than the standard resolution and matches both the third resolution and the second resolution, as the target resolution. As a result of this, as an example, even when the target resolution cannot be set among resolutions that are not less than the standard resolution, the target resolution can be set to a resolution that is less than the standard resolution and is relatively large. As a result of this, as an example, the video quality of the second video can be prevented from degradation resulting from the target resolution set to an exceedingly small resolution.

In the embodiment, as described above, the controller 15 is configured to determine whether there is any second resolution that matches the maximum third resolution that is less than the standard resolution. The controller 15 is configured to set, if the second resolution that matches the maximum third resolution exists, the second resolution that matches the maximum third resolution as the resolution of the second video. The controller 15 is configured to repeat, if no second resolution that matches the maximum third resolution exists, the second cycle determining whether there is any second resolution that matches the third resolution that is smaller than the standard resolution next to the maximum third resolution. As a result of this, as an example, even when the target resolution cannot be set among resolutions that are not less than the standard resolution, the target resolution is searched for successively in descending resolution order among resolutions that are less than the standard resolution, thereby the target resolution that is closest to the standard resolution can be easily set.

In the embodiment, as described above, the controller 15 is configured to set the third resolution of the entire display screen of the display module 12 as the standard resolution if the first mode is selected. The controller 15 is configured to set the third resolution of the moving image part of the entire display screen as the standard resolution if the second mode is selected. The first mode is configured to allow the display module 22 of the television device 20 to display the third video (see images IM3 and IM4 in FIG. 3) as the second video. The third video corresponds to the entire display screen (see images IM1 and IM2 in FIG. 4) of the display module 12. The second mode is configured to allow the display module 22 of the television device 20 to display the fourth video (see image IM5 in FIG. 4) as the second video. The fourth video corresponds to the first video (see image IM1 in FIG. 4) of the entire video screen of the display module 12. As a result of this, as an example, the standard resolution can be appropriately set depending on whether the first mode or the second mode is selected.

The tablet according to the above embodiment has hardware structure using a normal computer. A program executed by the controller of the tablet is stored in a storage module configured with a ROM, a RAM, or the like. The program is provided as a computer program product which is recorded in a computer-readable recording medium such as a CD-ROM, a flexible disk (FD), a CD-R, and a digital versatile disc (DVD) as a file in an installable format or an executable format. The program may be stored in a computer connected to a network such as the Internet and is provided or distributed through the network. The program may be provided by being installed in a ROM or the like in advance.

For example, the above embodiment shows an example in which one technology is applied to a tablet (a portable information terminal) as an example of the electronic device. However, the technology can also be applied to a portable information terminal other than the tablet (a smartphone or the like) and electronic devices other than portable information terminals (an information processor such as a PC). The above embodiment shows an example in which display data is transmitted and received using Miracast (registered trademark). However, the technology can also be applied to a case in which display data is transmitted and received using a technology other than Miracast.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
    a first display configured to display first video;
    a transmitter configured to transmit second video to a second electronic device comprising a second display; and
    a controller configured to determine a first resolution of the second video based on the first video, to convert the second video to the first resolution, and to transmit the converted second video to the second electronic device, wherein
        the first display is configured to display the first video at different resolutions,
        the second display is configured to display the second video at different resolutions, and
        the controller is configured:
            to set a standard resolution based on the first video and to set a target resolution of the second video based on the standard resolution, the standard resolution being smaller than a maximum resolution allowed by both the first display and the second display, the target resolution being closest to the standard resolution and common to the first display and the second display;
            to set a minimum resolution that is not less than the standard resolution, and common to the first display and the second display, as the target resolution; and
            to determine whether there is any second resolution of the second video that matches a minimum third resolution of the first display that is not less than the standard resolution, to set the second resolution that matches the minimum third resolution as the target resolution when the second resolution that matches the minimum third resolution exists, and to repeat a first cycle when no second resolution that matches the minimum third resolution exists, the first cycle determining whether there is an second resolution that matches a third resolution that is larger than the standard resolution next to the minimum third resolution.

2. The electronic device of claim 1, wherein the controller is configured to set, when repetition of the first cycle fails to determine the target resolution, the maximum resolution that is less than the standard resolution and matches both the third resolution and the second resolution, as the target resolution.

3. The electronic device of claim 2, wherein the controller is configured to determine whether there is any second resolution that matches a maximum third resolution that is less than the standard resolution, to set the second resolution that matches the maximum third resolution as the target resolution, and to repeat a second cycle when no second resolution that matches the maximum third resolution exists, the second cycle determining whether there is any second resolution that matches the third resolution that is smaller than the standard resolution next to the maximum third resolution.

4. An electronic device comprising:
    a first display configured to display first video;
    a transmitter configured to transmit second video to a second electronic device comprising a second display; and
    a controller configured to determine a first resolution of the second video based on the first video, to convert the second video to the first resolution, and to transmit the converted second video to the second electronic device, wherein
        the first display is configured to display the first video at different resolutions,
        the second display is configured to display the second video at different resolutions, and
        the controller is configured:
            to set a standard resolution based on the first video and to set a target resolution of the second video based on the standard resolution, the standard resolution being smaller than a maximum resolution allowed by both the first display and the second display, the target resolution being closest to the standard resolution and common to the first display and the second display,
    wherein
        the electronic device is configured to select between a first mode and a second mode, the first mode allowing the second display to display third video as the second video, the third video corresponding to the entire display screen of the first display, the entire display screen including the first video, the second mode allowing the second display to display fourth video as the second video, the fourth video corresponding to the first video of the entire display screen, and the controller is configured to set the third resolution of the entire display screen of the first display as the standard resolution when the first mode is selected and to set the third resolution of the first video of the entire display screen as the standard resolution when the second mode is selected.

5. A method for transmitting display data from a first electronic device to a second electronic device, the first electronic device comprising a first display configured to display first video, the method comprising:

determining a first resolution of second video based on corresponding first video, and transmitting the second video converted to the first resolution from the first electronic device to the second electronic device configured to display the second video on a second display, wherein the first display is configured to display the first video at different resolutions, the second display is configured to display the second video at different resolutions, and the determining comprises:

setting a standard resolution based on the first video and setting a target resolution of the second video based on the standard resolution, the standard resolution being smaller than a maximum resolution allowed by both the first display and the second display, the target resolution being closest to the standard resolution and common to the first display and the second display;

setting a minimum resolution that is not less than the standard resolution, and common to the first display and the second display, as the target resolution; and determining whether there is any second resolution of the second video that matches a minimum third resolution of the first display that is not less than the standard resolution, setting the second resolution that matches the minimum third resolution as the target resolution when the second resolution that matches the minimum third resolution exists, and repeating a first cycle when no second resolution that matches the minimum third resolution exists, the first cycle determining whether there is an second resolution that matches a third resolution that is larger than the standard resolution next to the minimum third resolution.

6. A computer program product having a non-transitory computer readable medium including programmed instructions, wherein the instructions, when executed by a computer of a first electronic device comprising a first display configured to display first video, cause the computer to perform:

determining a first resolution of second video based on corresponding first video, and transmitting the second video converted to the first resolution from the first electronic device to the second electronic device configured to display the second video on a second display, wherein the first display is configured to display the first video at different resolutions, the second display is configured to display the second video at different resolutions, and the determining comprises:

setting a standard resolution based on the first video and setting a target resolution of the second video based on the standard resolution, the standard resolution being smaller than a maximum resolution allowed by both the first display and the second display, the target resolution being closest to the standard resolution and common to the first display and the second display;

setting a minimum resolution that is not less than the standard resolution, and common to the first display and the second display, as the target resolution; and determining whether there is an second resolution of the second video that matches a minimum third resolution of the first display that is not less than the standard resolution, setting the second resolution that matches the minimum third resolution as the target resolution when the second resolution that matches the minimum third resolution exists, and repeating a first cycle when no second resolution that matches the minimum third resolution exists, the first cycle determining whether there is any second resolution that matches a third resolution that is larger than the standard resolution next to the minimum third resolution.

\* \* \* \* \*